(12) United States Patent
Winston et al.

(10) Patent No.: US 11,783,537 B2
(45) Date of Patent: Oct. 10, 2023

(54) DISTRIBUTED RENDERING AND DISPLAY SYSTEM

(71) Applicant: Holochip Corporation, Torrance, CA (US)

(72) Inventors: Steven Winston, Orange, CA (US); Samuel T. Robinson, Los Angeles, CA (US); Robert G. Batchko, Torrance, CA (US)

(73) Assignee: Holochip Corporation, Torrance, CA (US)

( * ) Notice: Subject to any disclaimer, the term of this patent is extended or adjusted under 35 U.S.C. 154(b) by 10 days.

(21) Appl. No.: 17/549,614

(22) Filed: Dec. 13, 2021

(65) Prior Publication Data

US 2022/0189107 A1    Jun. 16, 2022

Related U.S. Application Data

(60) Provisional application No. 63/125,393, filed on Dec. 14, 2020.

(51) Int. Cl.
*G06T 1/20* (2006.01)
*G06T 1/60* (2006.01)
*G06T 15/00* (2011.01)
*G06T 15/40* (2011.01)

(52) U.S. Cl.
CPC ............. *G06T 15/405* (2013.01); *G06T 1/20* (2013.01); *G06T 1/60* (2013.01); *G06T 15/005* (2013.01)

(58) Field of Classification Search
CPC ... A63F 13/00; G06T 1/20; G06T 1/60; G06T 15/005; G06T 15/405; G06T 19/006; G09G 5/39; G09G 5/393; G09G 5/395; G09G 2360/04; G09G 2360/06
USPC .................................................. 345/422, 545
See application file for complete search history.

(56) References Cited

U.S. PATENT DOCUMENTS

| | | | |
|---|---|---|---|
| 6,674,430 B1 | 1/2004 | Kaufman et al. | |
| 10,089,796 B1* | 10/2018 | Ernst | G06T 7/529 |
| 10,503,457 B2* | 12/2019 | Dimitrov | G06T 15/005 |
| 2017/0180800 A1* | 6/2017 | Mayrand | G06F 3/005 |

* cited by examiner

*Primary Examiner* — Jacinta M Crawford
(74) *Attorney, Agent, or Firm* — Wheatstone IP Law Corporation; Milad G. Shara

(57) ABSTRACT

A rendering system comprises a host device disposed in communication with one or more rendering pipelines. Each rendering pipeline comprises a rendering device and a display device. Each display device enables one or more users to view a scene rendered on the host device. Each rendering pipeline provides the user with independent control of their perspective of the scene. The host device receives a CG camera definition from each rendering pipeline and uses it to perform geometry culling and creates a z-buffer for each rendering pipeline. For each rendering pipeline, the rendering device receives a z-buffer and renders a frame buffer for the display device. This architecture reduces the rendering power requirements of the rendering device for each rendering pipeline as compared to performing all rendering on the rendering device, and is particularly useful when multiple users are viewing a complex scene such as a high fidelity simulation environment.

6 Claims, 8 Drawing Sheets

DISTRIBUTED RENDERING AND DISPLAY SYSTEM

CROSS-REFERENCE TO RELATED APPLICATION

The present application claims priority to U.S. Provisional Application No. 63/125,393 entitled DISTRIBUTED RENDERING AND DISPLAY SYSTEM filed on Dec. 14, 2020, the entirety of which is hereby incorporated by reference.

TECHNICAL FIELD

This disclosure relates to rendering and more particularly to rendering of a three-dimensional scene.

BACKGROUND

Current real-time rendering architectures typically require that any user viewing a rendered scene must do so using rendering hardware to perform both culling on the scene geometry and rendering of a frame buffer for a computer-generated (CG) camera. This means users viewing a scene with complex and/or extensive geometry require consuming high resource and bandwidth in the rendering hardware.

DESCRIPTION OF DRAWINGS

Like reference symbols in the various figures indicate like elements.

DETAILED DESCRIPTION

Figure 1A:
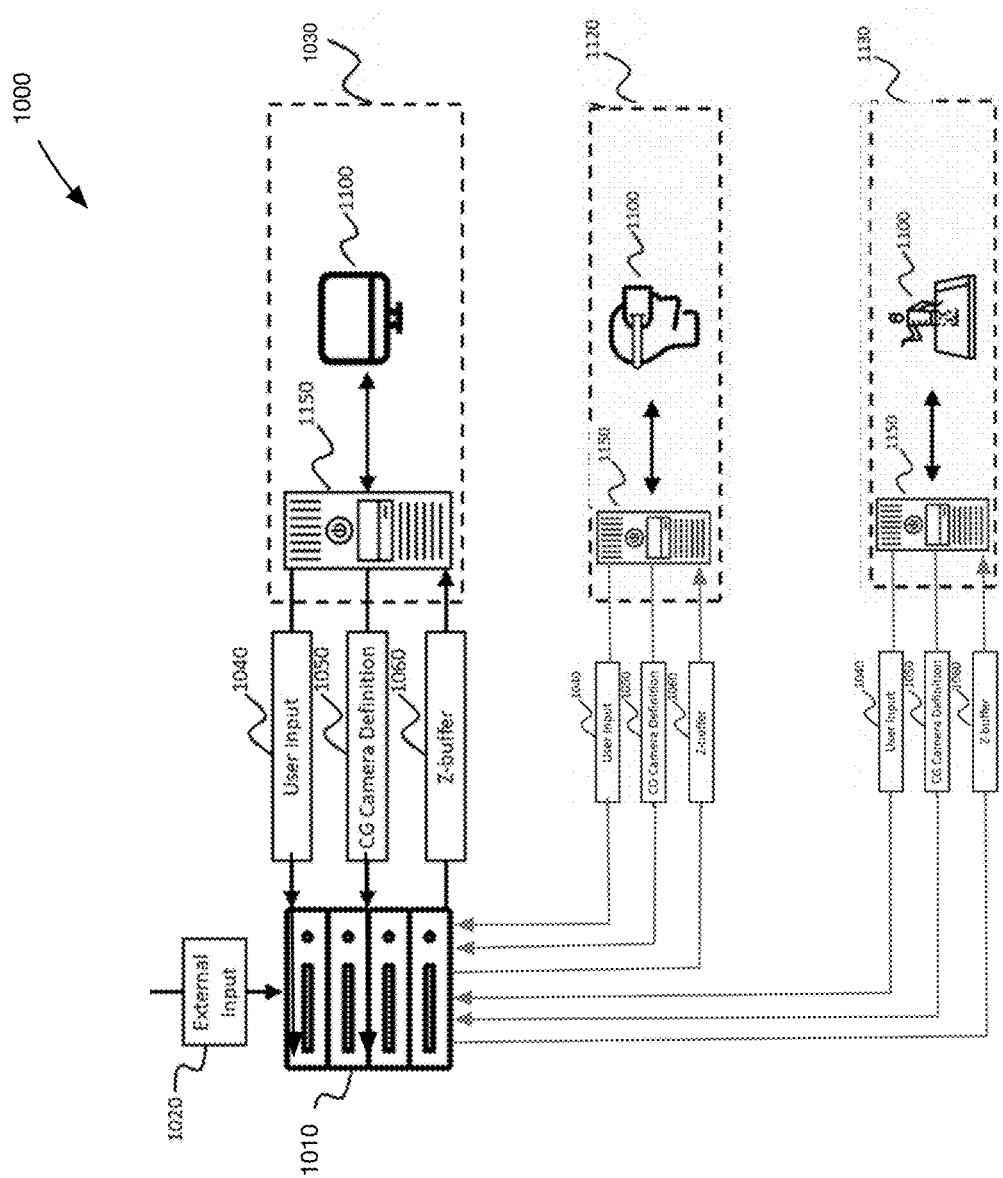
FIG. 1A is a schematic of a host device and multiple rendering pipelines configured to display a view of a scene rendered on the host device.

The specification describes systems, methods, devices, and techniques for distributed rendering and displaying of scene data. For example, a distributed rendering and display system includes a host device, frame rendering devices (the "pipeline rendering devices") connected to the host device, and display devices associated with the frame rendering devices.

The host device receives scene data from an external source, and user data and computer-generated (CG) camera definition data from each of the rendering devices. The host device includes a host rendering subsystem and a memory buffer having memory blocks associated with the pipeline rendering devices. The host rendering subsystem receives the scene data, the user data, and the CG camera definition to cull scene geometry and render z-buffers that are stored in the memory blocks associated with the pipeline rendering devices. Each of the pipeline rendering devices receive the z-buffers associated with the pipeline rendering device to render and provide pipeline frame buffers that reflect a view perspective of the scene data at the display device associated with the pipeline rendering device. For example, each of the display devices may simultaneously display the scene data having a view perspective that is determined by the pipeline frame data that was rendered by the pipeline rendering device associated with the display device.

An example process for rendering frame buffers for the display devices includes: a) each rendering pipeline provides the host device with a computer-generated (CG) camera definition; b) a memory buffer is created on the host device to hold the rendered z-buffers for each of the rendering pipelines; c) the CG camera definitions are used to render scene geometry to a unique z-buffer for each rendering pipeline; d) each z-buffer is transmitted to its associated rendering pipeline; e) each rendering pipeline uses the received z-buffer to render an appropriate frame buffer; and f) the rendered frame buffer is sent to the associated display device.

In other embodiments, the rendering and display system may include a plurality of host devices associated with the pipeline rendering devices. The distributed rendering and display system may include the host device and the rendering pipeline devices being disposed on remote machines. Alternatively, the host device and the rendering pipeline device may be disposed in the same box (i.e., computer). Also, the host device and rendering device may be structured together such that the display devices are remotely connected to the rendering device.

For example, selecting the z-buffer may depend on the type of display device. In a single display, the z-buffer may be the frustum of a single view. In another example, a display device with more than one view frustum may have all the views in one z-buffer. As the number of the views increase, the size and data contained in a z-buffer may also increase while the number of z-buffers remain the same. According to another embodiment, the z-buffers may be selected for each frame when there's no difference between the previous frame's camera position and next position.

The rendering structures and processes are distributed between the host device for cull scene geometry and z-buffer rendering and the pipeline rendering devices for their associated frame buffer rendering. The host device is configured to store elements of the scene into an acceleration structure and create multiple display device specific z-buffers. Each pipeline rendering device may be structured to only have enough rendering power to use the received z-buffer to render a frame buffer of resolution equal to the resolution of its associated display device. This supports controlling the rendering (or "processing") power required of each rendering pipeline to be reduced and independent from the complexity of the scene. Also, this can increase speed for transferring large amounts of data (the z-buffer) to multiple boxes (the rendering pipeline devices). The system can support displaying N number of views for the computational resource cost of displaying one view.

In another embodiment, a distributed rendering and display system for providing display view perspectives of a scene includes a host device for rendering z-buffers from the scene; a set of pipeline rendering devices; and a set of display devices. Each display device in the set of display devices is associated with a pipeline rendering device in the set of pipeline rendering devices. The pipeline rendering device generates user input data and computer-generated camera definition associated with the display device. The host device receives the user input data and computer-generated camera definition to select a set of z-buffers from the rendered z-buffers. The pipeline rendering device receives the set of z-buffers to render frame buffer. The display device receives the rendered frame buffers to determine the display view perspective for the scene. The host device may include a host rendering sub-system for rendering the z-buffers and a memory buffer having a set of memory blocks for storing the rendered z-buffers. The pipeline rendering device may be associated with a memory block from the group of memory blocks. Each of the display devices may simultaneously display the scene having a view perspective that is determined by the frame buffers rendered by the pipeline rendering device associated with the display device. The host device may be directly connected to the set of pipeline rendering devices and set of display devices. Alternatively, the host device may be remotely connected to the set of pipeline rendering devices and set of display devices. According to another aspect, the host device and the set of pipeline rendering devices may be remotely connected to the set of display devices.

According to another aspect, a rendering system includes a host device having a memory buffer for storing z-buffers; a rendering device; and a display device. The host device renders the scene to the z-buffer, the rendering device receives the z-buffer to render a frame buffer, and the display device displays the frame buffer.

According to another embodiment, a distributed rendering and display system that provides display view perspectives of a scene. The distributed rendering and display system includes a host device for generating z-buffers from the scene; a pipeline rendering device; and a display device. The pipeline rendering device generates user input data and computer-generated camera definition associated with the display device. The host device receives the user input data and computer-generated camera definition to select a set of z-buffers from the generated z-buffers; the pipeline rendering device receives the set of z-buffers to render frame buffers; and the display device receiving the frame buffers to determine the display view perspective for the scene.

This system can also support real-time rendering, collaboration between multiple users, and enables each rendering pipeline to use numerous types of desired displays, including but not limited to: virtual reality (VR), augmented reality (AR), mixed reality (MR), computer monitor, smartphone screen, television screen, autostereoscopic, three-dimensional (3D), glasses-free 3D, lenticular screen, holographic, light field, and volumetric display. Also, standard graphics structure may be used on the host rendering subsystem and on the pipeline rendering devices.

FIG. 1A is an example embodiment of a distributed rendering and display system 1000 comprising a host device 1010 disposed in communication with at least one rendering pipeline 1030. Additional rendering pipelines may be disposed in communication with host device 1010, represented by rendering pipelines 1120, 1130. Rendering Pipeline 1030 includes a rendering device 1150 disposed in communication with a display device 1100. Display device 1100 may be configured to provide a user with a view of 3D, or higher dimensionality, CG scene ("Scene") 2000 (shown in FIG. 2). Host Device 1010 and rendering device 1150 share responsibility for rendering a view of scene 2000. In some embodiments, multiple rendering pipelines, exemplified by rendering pipelines 1030, 1120, 1130, may be connected to at least one host device 1010, wherein the users of each rendering pipeline may view scene 2000 from a unique perspective. In some embodiments, display device 1100 may be configured to provide a user with a view of a real-world scene captured with cameras. The embodiments for a camera include a computer-generated camera, a virtual camera, a synthetic camera, a physical camera, or a real camera.

Host device 1010 may be configured to receive data via Input 1020 from one or more external sources, which may include without limitation one or more of the following list: internet, intranet, user input, or sensor input, physical cameras and external scene data such as satellite/radar. Host device 1010 may be further configured to receive CG camera definition 1050 from render pipeline 1030. CG camera definition 1050 may include without limitation one or more of the following camera specifications: position, orientation, field of view, view frustum, and near and far clipping planes. Host Device 1010 may use CG camera definition 1050 to render the geometry of a scene 2000 to Z-buffer 1060, which may be sent to render pipeline 1030. Device 1010 may be still further configured to receive user input 1040 from render pipeline 1030.

Figure 4:
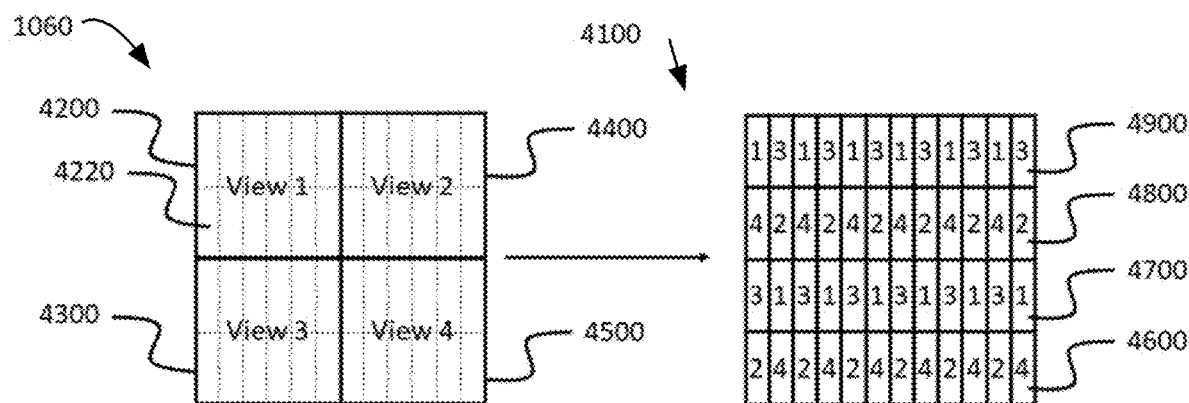
FIG. 4 is an illustration of a z-buffer received by a rendering device and rendered to a frame buffer to be displayed on a display device.

Rendering device 1150 may be configured to receive (or utilize) Z-buffer 1060 from host device 1010 to render frame buffer 4100 (see FIG. 4). Frame Buffer 4100 may then be displayed on display device 1100. In some embodiments, Rendering device 1150 may be a full, stand-alone, computer system. In other embodiments, rendering device 1150 may be separate processing elements including but not limited to CPU, GPU, FPGA and ASIC. In still further embodiments, Rendering device 1150 may be incorporated, integrated or embedded into display device 1100. Rendering device 1150 may communicate with host device 1010 via a local wired network, local wireless network, or network connection over the internet. In other embodiments, host device 1010 and rendering device 1150 may both be part of a single computer in which the two devices may be disposed in communication with each other using the system bus. In some embodiments, display device 1100 and rendering device 1150 may be connected via a local wired or wireless connection. In other embodiments, display device 1100 may be connected to rendering device 1150 via an internet or intranet connection.

Display device 1100 may be of a type that includes without limitation one or more of the following list: VR, AR, MR, computer monitor, smartphone screen, television screen, autostereoscopic, 3D, glasses-free 3D, lenticular screen, holographic, light field, volumetric, or any other standard or non-standard display type. Display Device 1100 may provide rendering device 1150 with CG camera definition 1050. Position and orientation characteristics of CG Camera Definition 1050 may be determined using sensors connected to or integrated with display device 1100. In some embodiments, display device 1100 may be a head worn system, and position and orientation characteristics of CG camera definition 1050 may be determined by sensors integrated into display device 1100. In other embodiments, display device 1100 may include user input devices or methods that are capable of determining the position and orientation characteristics of CG camera definition 1050. Display device 1100 may additionally provide rendering device 1150 with field of view, view frustum, and near and far clipping planes characteristics of CG camera definition 1050.

Figure 1B:
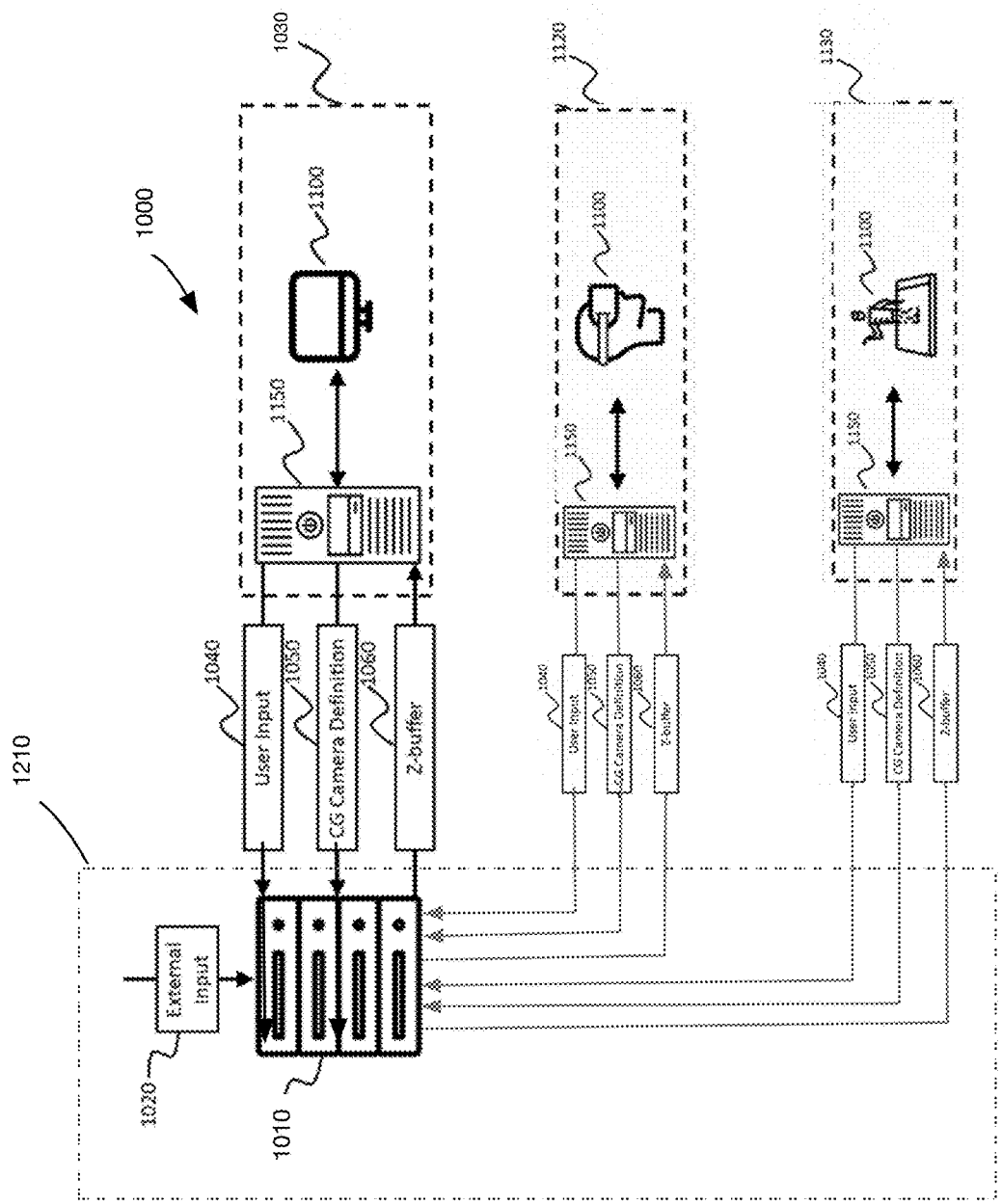
FIG. 1B is a schematic of a host device remotely connected to multiple rendering pipelines configured for displaying a view of a scene rendered on the host device.

FIG. 1B is an example of the distributed rendering and display system 100 of FIG. 1A with a host device being remotely connected 1210 to multiple rendering pipelines configured to display a view of a scene rendered on the host device. In this example, the rendering pipeline is remotely assisted by the host device.

Figure 1C:
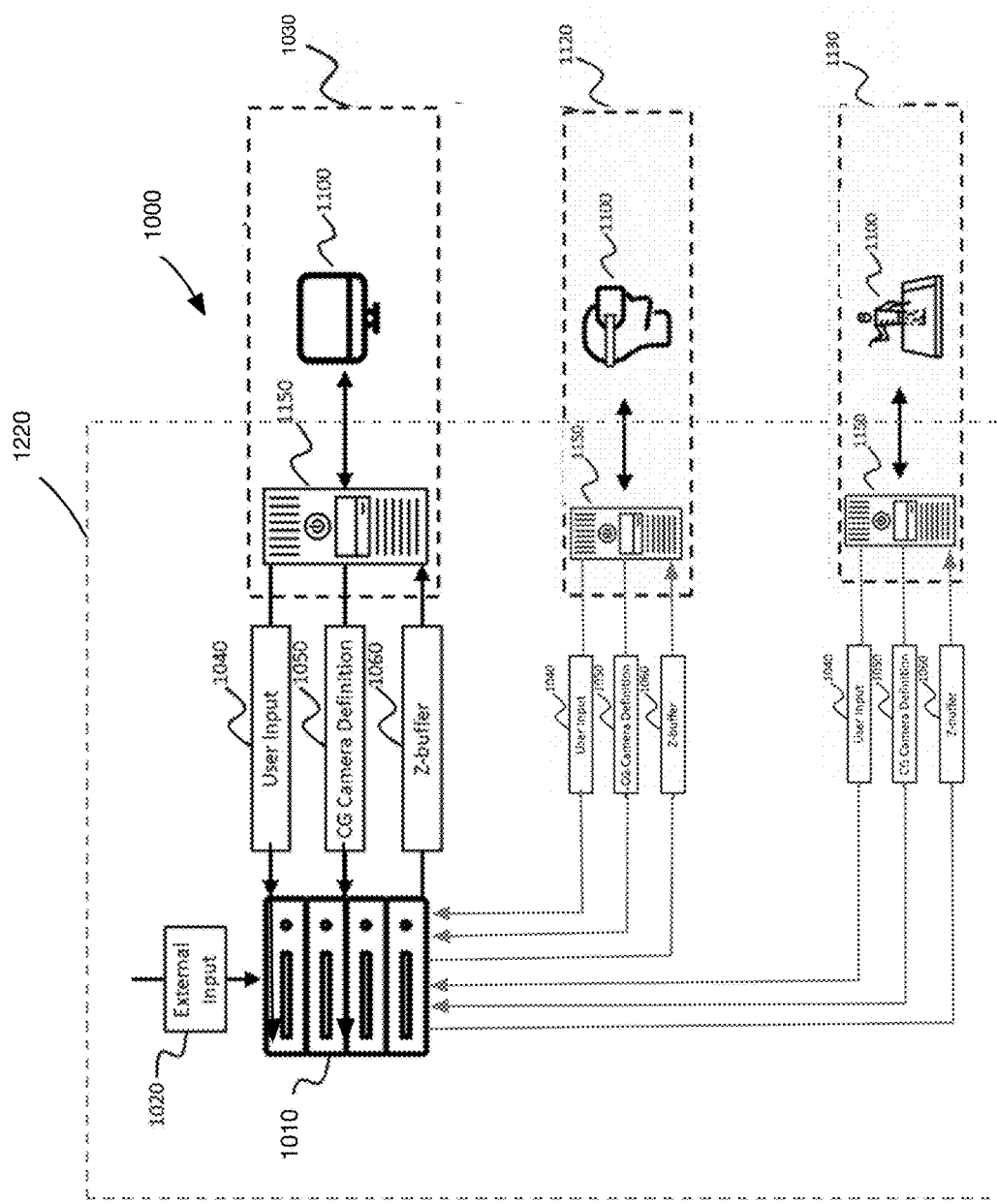
FIG. 1C is a schematic of a host device and multiple rendering devices that are remotely connected to multiple display devices for displaying a view of a scene rendered on the host device.

FIG. 1C is an example of the distributed rendering and display system 100 of FIG. 1A with a host device and multiple rendering devices that are remotely connected 1220 to multiple display devices to display a view of a scene rendered on the host device.

Figure 2:
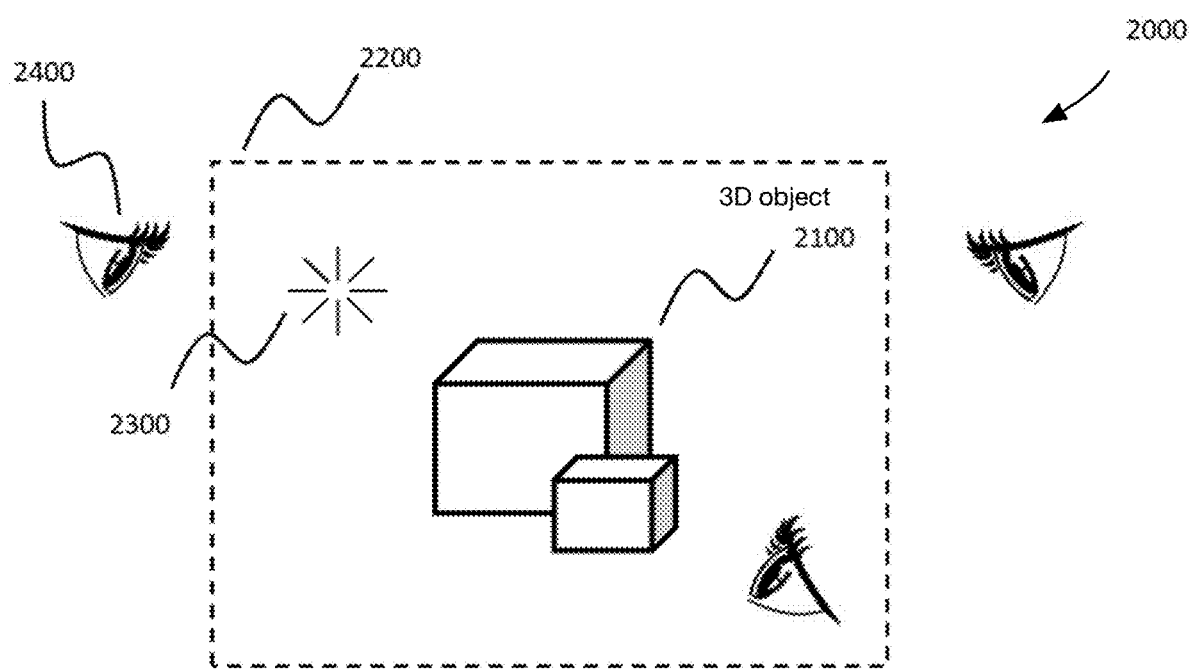
FIG. 2 is an illustration of a CG 3D scene and the perspectives from which multiple users are viewing the scene.

FIG. 2 is an illustration CG scene 2000 that is rendered on host device 1010 (shown in FIG. 1). Scene 2000 may contain 3D objects and light sources exemplified by 3D object 2100, and light source 2300. Scene 2000 may be bounded by scene boundary 2200. Scene 2000 may be viewed by a number of users (not shown). For display devices 1100 intended for use by a single user, the number of users may be substantially equal to the number of rendering pipelines connected to host device 1010 (shown in FIG. 1). Likewise, for display devices 1100 intended for use by multiple users, the number of users may be substantially different than the number of rendering pipelines connected to host device 1010. Each user may view scene 2000 from a unique perspective, represented by user perspective 2400. User perspective 2400 may represent the location and orientation of a CG camera used to render the geometry of scene 2000 to z-buffer 1060 (shown in FIG. 1). A unique z-buffer may be rendered for each rendering pipeline.

Figure 3:
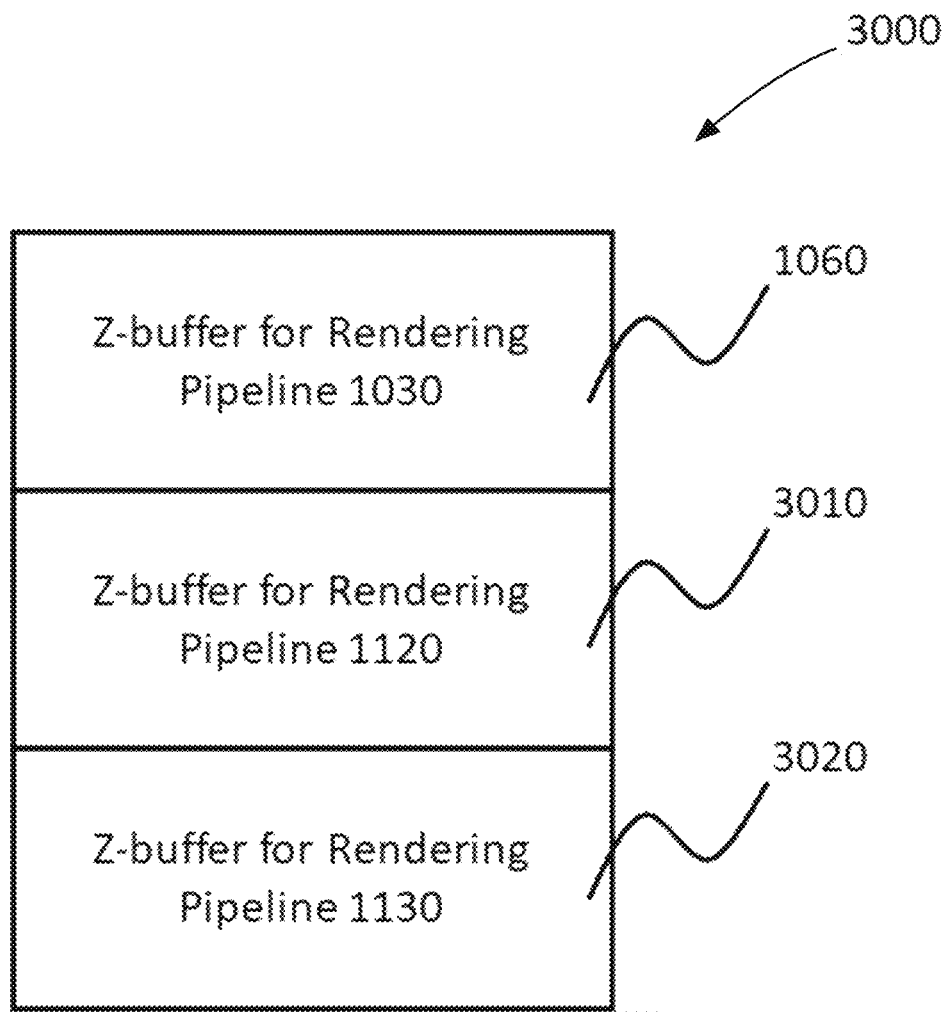
FIG. 3 is an illustration of a memory buffer that is partitioned into multiple memory blocks for storing unique z-buffers, each of which is assigned to a unique rendering pipeline.

FIG. 3 is an illustration of memory buffer 3000 on host device 1010 (shown in FIG. 1). Memory buffer 3000 may be created by rendering the geometry of scene 2000 (shown in FIG. 2) using multiple CG cameras (not shown). Memory buffer 3000 may be partitioned into a number of memory blocks 1060, 3010, 3020 for storing Z-buffers associated with rendering pipelines 1030, 1120, and 1130.

Unique CG cameras may exist for each rendering pipeline 1030, 1120, 1130, and be used to render scene 2000 to Z-buffers 1060, 3010, 3020 respectively. Once rendered, Z-buffers 1060, 3010, 3020 may be transmitted to the rendering device associated with rendering pipelines 1030, 1120, 1130, respectively.

The size of memory buffer 3000 may be determined during startup of the rendering application on host device 1010 (shown in FIG. 1). For example, the size of memory buffer 3000 may be specified by the size of z-buffers 3100, 3200, 3300 via communication with rendering pipelines 1030, 1120, 1130 (shown in FIG. 1). If additional rendering pipelines are connected to host device 1010 while the system is running, memory buffer 3000 may dynamically increase in size to accommodate the new rendering pipelines. If a rendering pipeline is disconnected from host device 1010 while running, memory buffer 3000 may remain the same size and a portion of said memory buffer 3000 may be unused. Memory buffer 3000 may dynamically decrease in size. Alternatively, memory buffer 300 remains the same size when there is sufficient memory on host device 1010.

FIG. 4 is an illustration of z-buffer 1060, received by rendering device 1150 (shown in FIG. 1), and frame buffer 4100, rendered by rendering device 1150. Frame buffer 4100 may be rendered by rendering device 1150 using the standard graphics pipeline. In some embodiments, frame buffer 4100 may be rendered using a fragment shader. In some embodiments, z-buffer 1060 may include multiple views of scene 2000. In some embodiments, CG camera definition 1050 may define the location of multiple individual CG cameras as shown by camera configuration 5600 (shown in FIG. 5). In some embodiments, z-buffer 1060 may be split into sections wherein each section represents a unique view of scene 2000, exemplified by views 4200, 4300, 4400, 4500. Each of views 4200, 4300, 4400, 4500 may be from positions which are distinct from one another but substantially similar to user perspective 2400 (shown in FIG. 2). z-buffer 1060 may comprise texels. Frame buffer 4100 may be created by rearranging the texels of Z-buffer 1060. For example, information from texel 4220 in Z-buffer 1060 may be copied to texel 4700 in frame buffer 4100. Frame buffer 4100 may then be sent to the pixel array of display device 1100.

The locations to which texels are rearranged between Z-buffer 1060 and frame buffer 4100 may depend on the configuration of display device 1100 (shown in FIG. 1). For example, display device 1100 may be configured as a multiview display wherein a user perceives a different view based on their position relative to the display. In this manner, when frame buffer 4100 is displayed on the pixel array of display device 1100, a user may see view 4200 when located at a first position (view zone 1) relative to display device 1100, view 4300 when at a second position (view zone 2), view 4400 when in a third position (view zone 3), and view 4500 when in a fourth position (view zone 4). In further embodiments, display device 1100 may be configured as a volumetric display wherein each view appears at a different depth location within the display. In still further embodiments, display 1100 may be configured as an AR or VR headset wherein unique views are presented to the user's right and left eyes. In some embodiments, the rearrangement of texels between z-buffer 1060 and frame buffer 4100 may include image distortion to compensate for optical aberrations in the display device 1100, such as geometric distortion due to the lenses of an AR or VR device. The number of distinct views present in z-buffer 1060 and frame buffer 4100 may be defined by CG camera definition 1050 (shown in FIG. 1) and may differ based on the type or configuration of display device 1100. In some embodiments, each display device 1100 may adhere to a standard which defines how the number of views are reported to rendering device 1150 and how rendering device 1150 may create CG camera definition 1050. In further embodiments, CG camera definition 1050 may be used to determine the way in which texels are rearranged between z-buffer 1060 and frame buffer 4100.

In some embodiments, optimizations may be made to reduce the memory size of z-buffer 1060 and thus reduce the bandwidth required to transfer z-buffer 1060 from host device 1010 to rendering pipeline 1030. One example of an optimization is as follows: Rather than rendering each view of scene 2000 to different regions of z-buffer 1060 (represented by views 4200, 4300, 4400, 4500), all views may be rendered into another z-buffer having a smaller number of total texels than z-buffer 1060, but in which overlap exists between different views. In this fashion, each texel may represent a unique location within scene 2000. However, some locations within scene 2000 may be visible from multiple views. The color, hue, and intensity of a single texel may be determined by rendering the color, hue, and intensity of the location within scene 2000 associated with said texel from all views to which it is visible and averaging the results. In some embodiments, an equation may be used to determine the color, hue, and intensity of a texel associated with a particular location in scene 2000, and the contributions from each view to which said location is visible may each be given a weight. The weighting of any view may be equal or not equal to the weighting of any other view.

Figure 5:
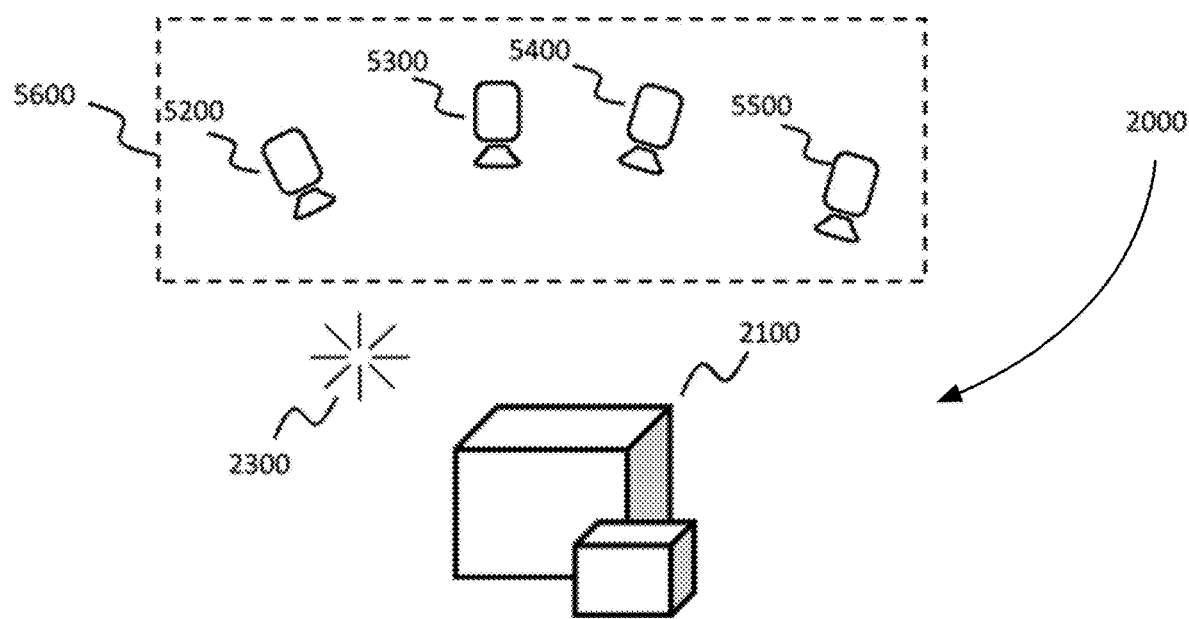
FIG. 5 is an illustration of a camera configuration used to render a CG scene.

FIG. 5 is an illustration of scene 2000 and camera configuration 5600 configured to render views 4200, 4300, 4400, 4500 of Scene 2000 to z-buffer 1060 (shown in FIG. 4). While four views are shown by way of example, camera configuration 5600 may be configured to render generally any number of views. In some embodiments, camera configuration 5600 may include multiple standard CG cameras exemplified by camera 5200, 5300, 5400, 5500, to render views 4200, 4300, 4400, 4500 respectively.

Rendering device 1150 may be configured to render views 4200, 4300, 4400, 4500 sequentially or in parallel. In some embodiments, the overall rendering speed may be improved by rendering views 4200, 4300, 4400, 4500 in parallel as this may be faster than rendering sequentially. In some embodiments, views 4200, 4300, 4400, 4500 may be rendered sequentially using a standard graphics pipeline. In other embodiments, views 4200, 4300, 4400, 4500 may be rendered in parallel using a custom graphics pipeline. A custom graphics pipeline may be implemented using a low-level Graphics Processing Unit ("GPU") language including but not limited to Vulkan, Metal, or DirectX 12 or higher. A custom graphics pipeline may enable one or more processing units ("Processing Unit") of the processor of rendering device 1150 to be assigned to render each of views 4200, 4300, 4400, 4500. The processor of rendering device 1150 may be of the type including but not limited to CPU, GPU, FPGA and ASIC. Views 4200, 4300, 4400, 4500 may be rendered using a raster-based or ray tracing-based method. In some embodiments, a parallel distributed rendering method may be employed wherein multiple Processing Units of the GPU may share responsibility of rendering a particular view. In other embodiments, Processing Units from multiple GPUs may be used together to perform parallel distributed rendering for a single view, wherein the GPUs are all part of the same computer system. In further embodiments, the multiple GPUs used for parallel distributed rendering may not be in the same computer system and are instead connected using a method including but not limited to: local network, internet, or other standard or non-standard method. In still further embodiments, Processing Units used for parallel distributed rendering may not be part of a GPU but instead part of a CPU, FPGA, ASIC, or other type of processor.

Figure 6:
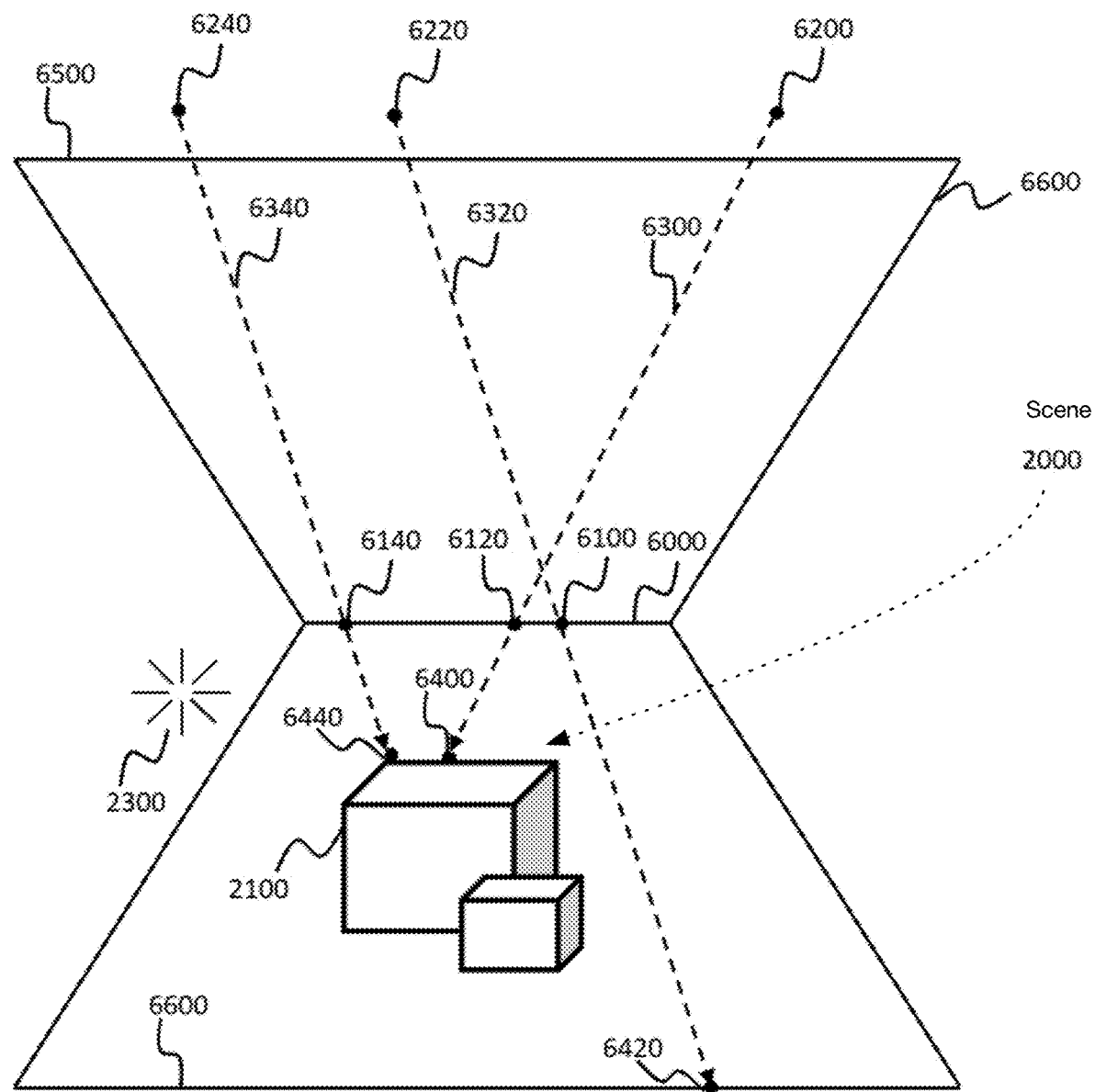
FIG. 6 is an illustration of a camera configuration wherein a single CG "multiview camera" renders a scene from multiple perspectives.

FIG. 6 is an illustration of a multiview camera configuration 6600, which is an alternative to camera configuration 5600 (shown in FIG. 5). Multiview camera configuration 6600 is configured as a single multiview camera, rather than multiple standard CG cameras which is the typical case for camera configuration 5600. Multiview camera configuration 6600 may enable z-buffer 1060 to be rendered in a single render pass, regardless of the number of views. By contrast, most current GPU hardware is limited to a maximum of 16 camera views per render pass. Thus, for large numbers of views, current GPU hardware requires multiple render passes to render z-buffer 1060. Multiview camera configuration 6600 may be primarily intended to be used in conjunction with ray-tracing-based rendering methods, however it may be used with modified raster-based rendering methods as well. One of the steps of raster-based rendering is known as z-buffering, a process that shares similarities with ray-tracing. During the z-buffering process, a CG camera with a defined texel resolution emits a ray for each texel to determine the depth location at which that ray intersects an object in the scene. The location at which the projected ray intersects with the object defines the z-buffer value of the texel associated with the ray. This z-buffer information may be used to create z-buffer 1060.

The first step to defining the structure of multiview camera configuration 6600 is to determine the desired layout of the texels in z-buffer 1060. In some embodiments, there may be no difference between Z-buffer 1060 and frame buffer 4100 (shown in FIG. 4), in which case Z-buffer 1060 may be sent directly to the screen of display device 1100.

Some display devices such as multiview displays and light field displays emit directional light when a pixel is illuminated. For these types of displays, CG camera definition 1050 may include directional information about the ray of light associated with each pixel of display device 1100. For each texel of Z-buffer 1060, a virtual texel may be defined within multiview camera configuration 6600 on virtual texel plane 6000, exemplified by virtual texel 6100, 6120, 6140. A ray may be defined for each virtual texel which originates at a Ray Origin Position ("ROP") and passes through the center of said virtual texel. Rays 6300, 6320, 6340 may originate at ROP 6200, 6220, 6240 respectively, and pass through the center of virtual texels 6100, 6120, 6140 respectively. In some embodiments ROP 6200, 6220, 6240 may be selected such that if virtual texel plane 6000 were scaled to have the same size as the display of multiview or light field display device 1100 and superimposed over said display, rays 6300, 6320, 6340 may be substantially collinear with the rays of light emitted by said display device when the physical pixels associated with virtual texels 6100, 6120, 6140 are illuminated. Near clipping plane 6500 and far clipping plane 6600 may bound the volume within which initial ray intersections are detected. Standard ray tracing methods may be used to determine the color and shading of the texels of Z-buffer 1060 associated with each ray.

The term "N number of views", or any other term similarly relating to a number of views, may be used synonymously with "multiple views," "one or more views," or "any number of views."

A number of example embodiments have been described. Nevertheless, it will be understood that various modifications may be made without departing from the spirit and scope of the devices and methods described herein.

What is claimed is:

1. A distributed rendering and display system for providing display view perspectives of a scene, the distributed rendering and display system comprising:
   a host device for rendering z-buffers from the scene;
   a set of pipeline rendering devices; and
   a set of display devices;
   wherein;
   each display device in the set of display devices is associated with a pipeline rendering device in the set of pipeline rendering devices, the pipeline rendering device generating user input data and computer-generated camera definition associated with the display device;
   the host device receives the user input data and computer-generated camera definition to select a set of z-buffers from the rendered z-buffers;
   the pipeline rendering device receives the set of z-buffers to render frame buffers; and
   the display device receiving the rendered frame buffers to determine the display view perspective for the scene.

2. A distributed rendering and display system according to claim 1, wherein:
   the host device includes a host rendering sub-system for rendering the z-buffers and a memory buffer having a set of memory blocks for storing the rendered z-buffers; and the pipeline rendering device being associated with a memory block from the group of memory blocks.

3. A distributed rendering and display system according to claim 1, wherein:
each of the display devices simultaneously display the scene having a view perspective that is determined by the frame buffers rendered by the pipeline rendering device associated with the display device.

4. A distributed rendering and display system according to claim 1, wherein:
the host device is remotely connected to the set of pipeline rendering devices and set of display devices.

5. A distributed rendering and display system according to claim 1, wherein:
the host device and the set of pipeline rendering devices are remotely connected to the set of display devices.

6. A distributed rendering and display system comprising:
a host device including memory for storing z-buffers; and
rendering pipelines in communication with the host device, wherein each rendering pipeline includes a rendering device and a display device;
wherein:
the host device renders a scene to the z-buffers;
the rendering device of each rendering pipeline uses at least one of the z buffers to render a frame buffer; and
the display device of each rendering pipeline displays the frame buffer rendered by the rendering device.

\* \* \* \* \*